(12) United States Patent  (10) Patent No.: US 7,137,591 B2
Carter et al.  (45) Date of Patent: Nov. 21, 2006

(54) TILTING MAST IN A ROTORCRAFT

(75) Inventors: Jay W. Carter, Burkburnett, TX (US);
George D. Mitchell, Cloudcroft, NM (US)

(73) Assignee: Cartercopters, L.L.C., Wichita Falls, TX (US)

( * ) Notice: Subject to any disclaimer, the term of this patent is extended or adjusted under 35 U.S.C. 154(b) by 147 days.

(21) Appl. No.: 10/782,353

(22) Filed: Feb. 19, 2004

(65) Prior Publication Data
US 2004/0232280 A1 Nov. 25, 2004

Related U.S. Application Data

(60) Provisional application No. 60/448,305, filed on Feb. 19, 2003.

(51) Int. Cl.
*B64C 27/00* (2006.01)

(52) U.S. Cl. .................................................. 244/17.27

(58) Field of Classification Search ............ 244/17.27, 244/17.11, 17.25, 12.4, 56, 66
See application file for complete search history.

(56) References Cited

U.S. PATENT DOCUMENTS

| 1,672,276 | A | * | 6/1928 | Nordberg ................. 416/121 |
| 2,468,913 | A | * | 5/1949 | Avery ...................... 244/7 R |
| 2,569,882 | A | * | 10/1951 | Washburn et al. ....... 244/17.25 |
| 3,554,467 | A | * | 1/1971 | Yowell ................... 244/17.19 |
| 4,485,446 | A | * | 11/1984 | Sassi ........................... 701/4 |
| 4,912,999 | A | | 4/1990 | Franks et al. |
| 5,098,033 | A | | 3/1992 | Haseloh et al. |
| 5,727,754 | A | | 3/1998 | Carter, Jr. |
| 5,740,987 | A | | 4/1998 | Morris et al. |
| 5,853,145 | A | | 12/1998 | Carter, Jr. |
| 5,865,399 | A | | 2/1999 | Carter, Jr. |
| 5,868,355 | A | | 2/1999 | Carter, Jr. |
| 5,944,283 | A | | 8/1999 | Carter, Jr. |
| 5,997,250 | A | | 12/1999 | Carter, Jr. |
| 6,155,784 | A | | 12/2000 | Carter, Jr. |
| 6,405,980 | B1 | | 6/2002 | Carter, Jr. |
| 6,435,453 | B1 | | 8/2002 | Carter, Jr. |
| 6,474,598 | B1 | | 11/2002 | Carter, Jr. |
| 6,513,752 | B1 | | 2/2003 | Carter, Jr. |
| 6,524,068 | B1 | | 2/2003 | Carter, Jr. |
| 6,527,515 | B1 | | 3/2003 | Carter, Jr. |

OTHER PUBLICATIONS

Article on web page titled Aero-Naval Research, regarding Split Axial Rotor Dynamics, Propulsion Control and Tilt Masting, USP 5,740,987, found at www.aero-naval.org/history.

* cited by examiner

*Primary Examiner*—Tien Dinh
(74) *Attorney, Agent, or Firm*—Bracewell & Giuliani LLP

(57) ABSTRACT

A rotorcraft includes a fuselage, a rotor assembly, a tail section connected to the fuselage, a propulsion system including an engine mounted to the fuselage, and a wing mounted to the fuselage. The rotor assembly includes a rotor having either a single or a plurality of rotor blades which can produce a resultant force vector which can pass through or near the center of gravity of the rotorcraft, and a spindle to connect the rotor with a flight control assembly. The rotor assembly also includes a tilting mast assembly having a tilting mast frame also connected to the spindle to support the rotor. The tilting mast tilts the rotor and provides cyclic control through a cyclic control linkage connected to the tilting mast frame. A mast control cylinder is provided to tilt the tilting mast assembly.

16 Claims, 9 Drawing Sheets

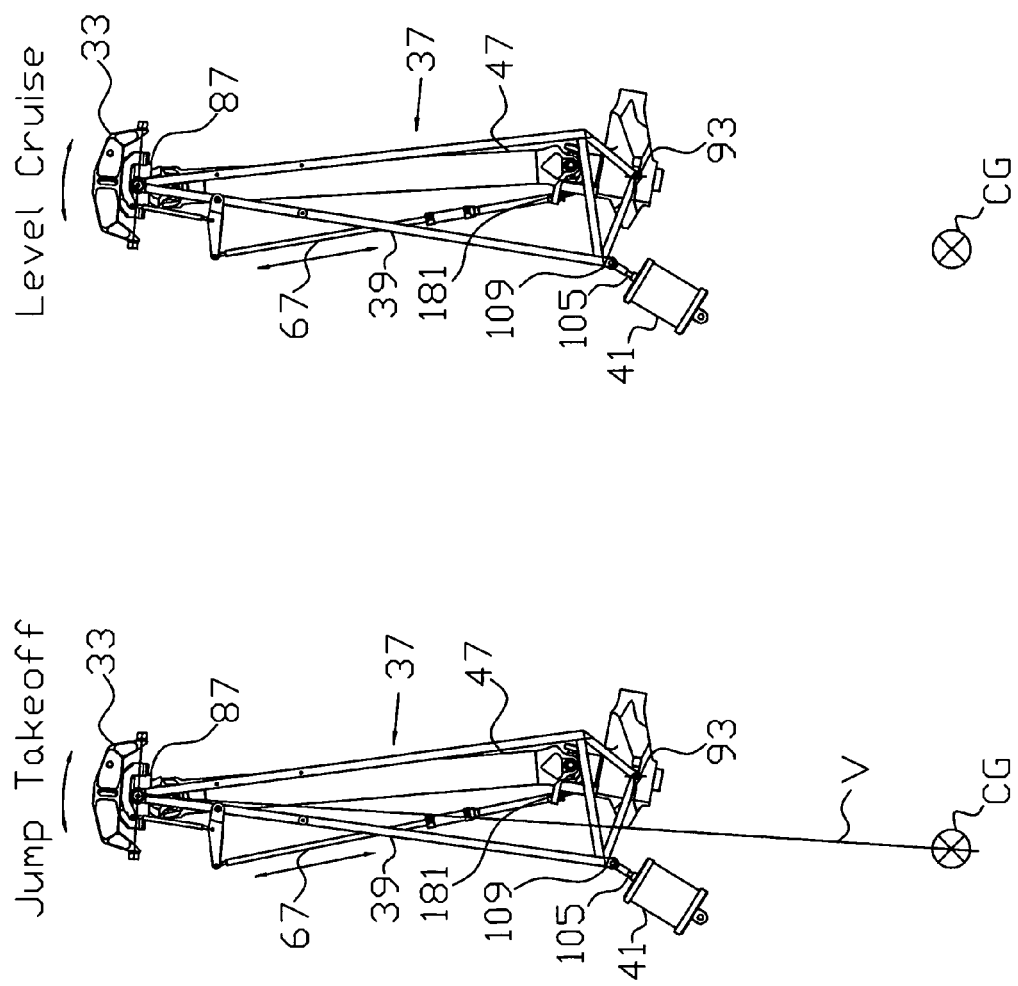

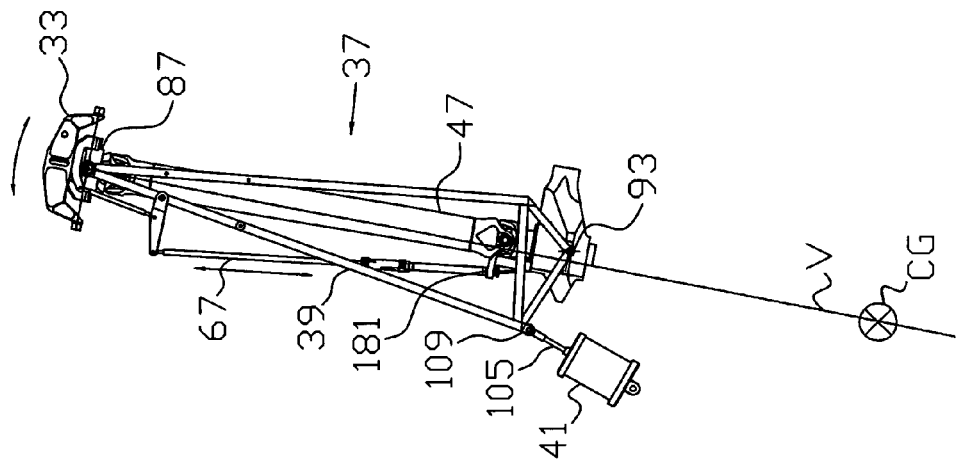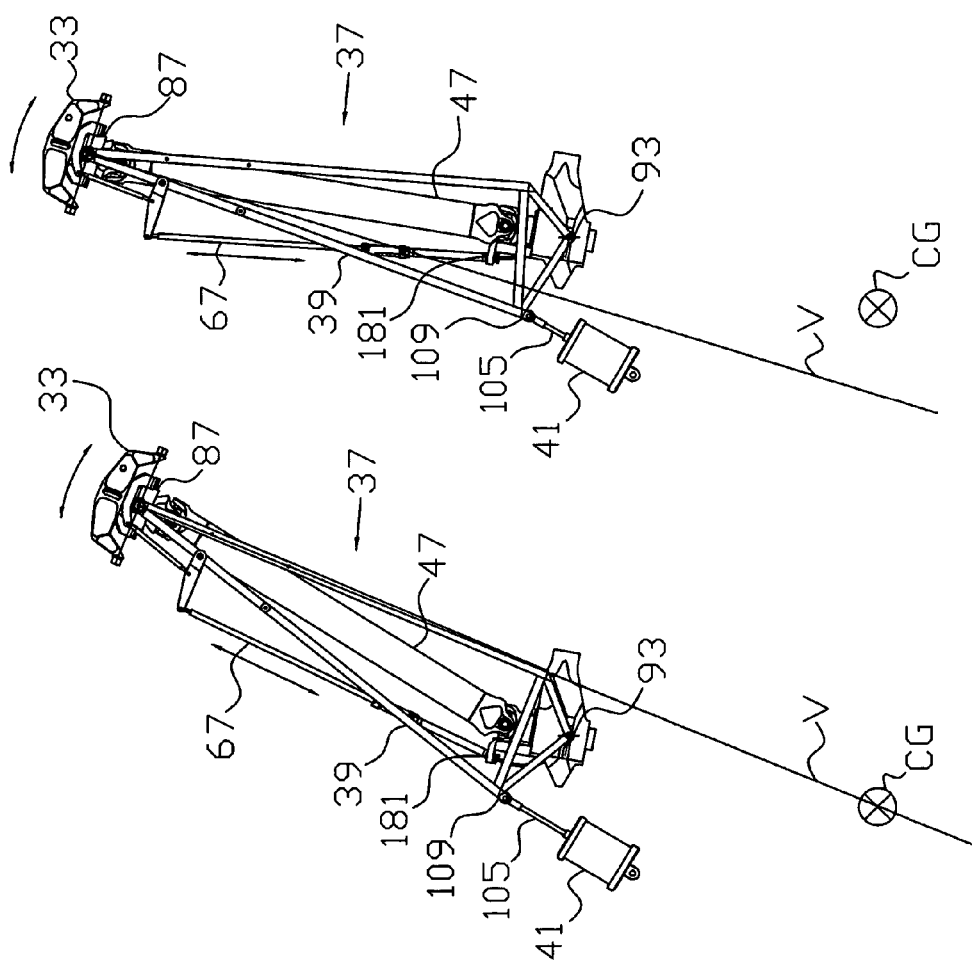

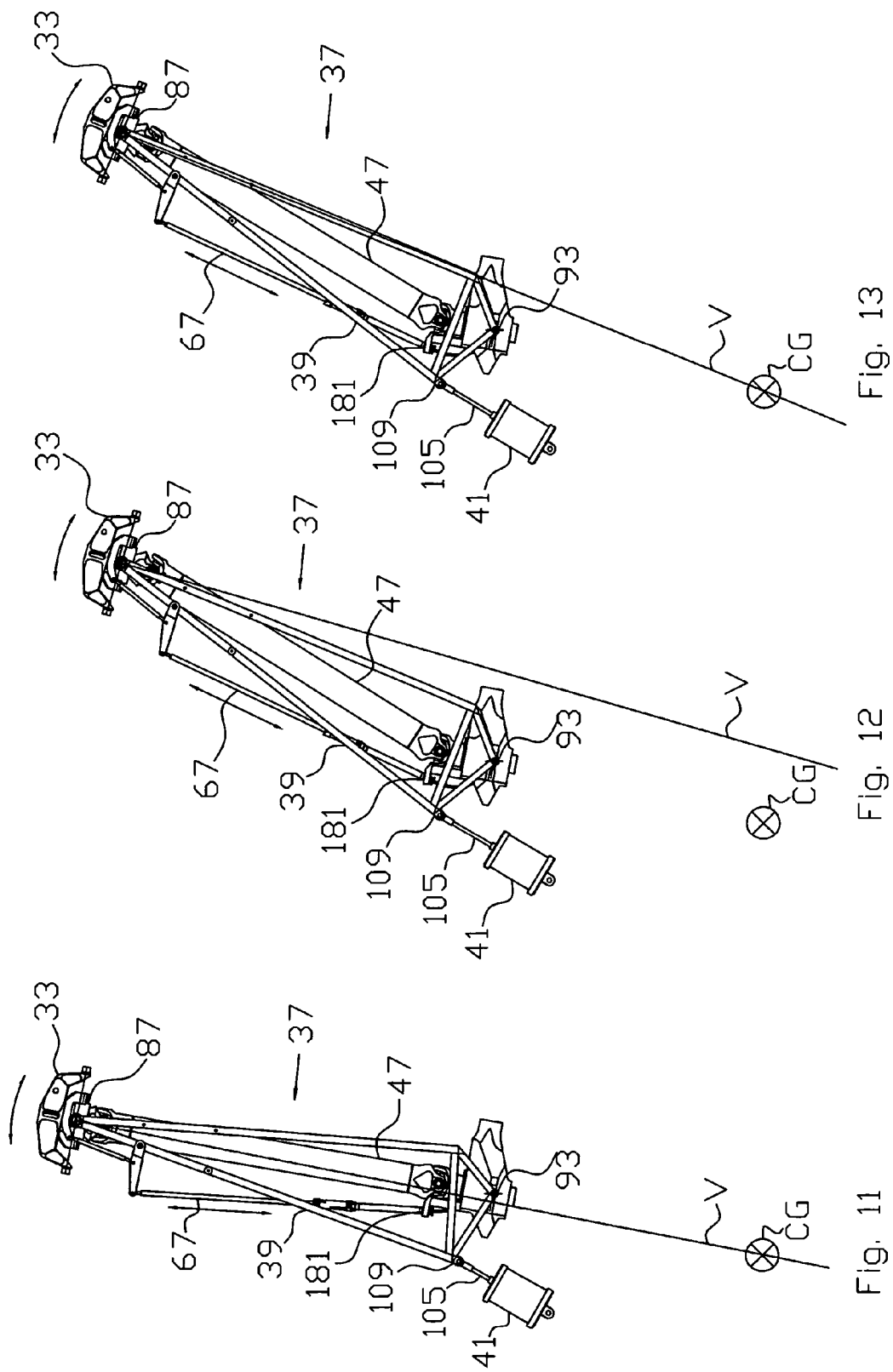

TILTING MAST IN A ROTORCRAFT

RELATED APPLICATIONS

This application claims priority from provisional application Ser. No. 60/448,305, titled "Tilting Mast In A Rotorcraft," filed on Feb. 19, 2003.

BACKGROUND OF THE INVENTION

1. Field of the Invention

The present invention relates generally to rotary wing aircraft. In more specific aspects, the present invention relates to the mast that supports the rotary wing system of a rotary wing aircraft and methods for use associated therewith.

2. Description of the Related Art

There are two types of heavier-than-air aircraft that achieve lift by movement through the air that relate to this art: (1) the airplane, and (2) the rotorcraft or rotary wing aircraft. The airplane has stationary wings that create lift when propelled through the air by a thrust mechanism such as a propeller or jet engine. The rotorcraft or rotary wing aircraft has blades that rotate to describe or form a rotor disc (the plane the rotor blades rotate in) positioned above the aircraft fuselage to create lift.

There are three types of rotorcraft that utilize a rotor blade to provide lift: (1) the helicopter, (2) the autogyro, and (3) the gyroplane. In the helicopter, the rotor blades are driven by an engine to rotate to form a plane of rotation which produces a resultant force vector defined as the vector sum of the rotor's lift and drag forces. This rotor disc provides a vertical lift vector or vertical thrust necessary to counteract the weight of the aircraft and thus provides for a vertical velocity. This rotor disc can be tilted on a supporting and/or rotating vertical mast. This tilting of the rotor disc results in a horizontal lift vector or horizontal thrust component, which counteracts drag in order to provide for a horizontal velocity. In the autogyro, vertical thrust is provided by a rotary wing or rotor forming a rotor disc and forward thrust is normally provided by a propeller. Autorotation is achieved by tilting the rotor disc back relative to the airflow so that some air flows up between the blades and through the rotor disc rather than down through the rotor disc as in a helicopter. As the air flows up through the rotor disc, the rotor disc is driven much like a windmill is driven by the wind. In the gyroplane, a rotor forming a rotor disc is used for vertical and slow speed flight, but at high speed cruising the rotor is unloaded (minimal lift) and the wing provides substantially all of the lift.

Trimming moments about the pitch axis of a rotorcraft require the rotor resultant force vector to pass through or near to the aircraft's center of gravity. This resultant force vector is close to and normally assumed to be normal or perpendicular to the rotor disc. This means that for a rotorcraft, such as a helicopter, to move forward against the drag on the aircraft, the rotor disc must be tilted forward (down) to cause the resultant force vector to be oriented forward of vertical. The resultant force vector, however, must remain close to the aircraft center of gravity with the result that the helicopter's fuselage also tilts nose down.

This tendency for the resultant force vector produced by the rotor of a rotorcraft to equalize any moments between the resultant force vector and the aircraft center of gravity is also manifest in other ways. For example, regarding a helicopter in a hover, as a result of the tendency for the resultant force vector to pass through the center of gravity, changing the location of the center gravity from say an aft center of gravity to a forward center of gravity, causes the fuselage of the helicopter to correspondingly tilt from a fuselage nose-up attitude to a fuselage nose-down attitude. Further, the combined effects of forward speed and this tendency for the resultant force vector to pass through the center of gravity, can cause large and sometimes undesirable fuselage attitudes in steady flight. These undesirable fuselage attitudes are made even larger during forward accelerations (often termed "dumping the nose") and nose-up "flares" typically required for deceleration. These undesirable attitudes are especially prevalent in helicopter designs where the mast of the rotor head has a preset forward tilt implemented to provide the aircraft fuselage with a more level attitude during cruise flight.

Similar to the helicopter, the autogyro also must have its resultant force vector pass through or near the aircraft center of gravity for trim, and hence, the fuselage must also tilt for airspeed changes and center of gravity trim. When the rotor of the autogyro is in autorotative flight, the rotor disc must be titled aft so that the airflow is up through the rotor blade to produce the autorotative force on the rotor blades. This typically means that the fuselage must also be nose-up. The slower the steady forward flight, the more the rotor disc must be tilted aft to generate sufficient vertical lift and hence the higher the nose-up fuselage angle required. Also similar to the helicopter, to slow down (decrease airspeed) or come to a stop, the autogyro typically must flare, nose-up, even further. In a jump take-off, however, the autogyro rotor disc, and thus the fuselage, will be level or nose-down.

Applicant recognizes that the above described fuselage attitudes of both helicopters and autogyros are sometimes uncomfortable to the occupants, and/or can cause loss of pilot visibility, and/or cause difficult and dangerous landing conditions. Adding wings to helicopters to make compound helicopters and adding wings to autogyros to make gyroplanes reduces, to some degree, the otherwise extreme attitudes in high speed flight. With the wing providing the major lift component during forward flight, the rotor resultant force vector is no longer as strong an influence on aircraft pitch trim. Likewise, in high-speed flight, it is not mandatory that the resultant force vector be required to pass close to the aircraft's center of gravity. Similar to a fixed wing airplane, pitch trim can be maintained in high-speed flight with use of a horizontal stabilizer and an elevator.

The winged helicopter and the winged autogyro, however, when in autorotation, can encounter excessive nose-up fuselage attitude in slow speed flight and/or flares, which will stall the wing. This is especially prevalent in extreme aft center of gravity loading conditions. So, like the helicopter and autogyro, the winged rotorcraft can also have design and flying concerns because of extreme fuselage attitudes. Thus, recognized is the need for a means to manipulate the rotor disc such that the resultant force vector is maintained at or near the aircraft center gravity to prevent excessive moments causing excessive fuselage pitching, especially in slow speed flight and during acceleration and deceleration.

SUMMARY OF THE INVENTION

In view of the foregoing, embodiments of the present invention advantageously provide an aircraft including an aircraft rotor assembly that eliminates the design and flying problems and concerns caused by fuselage attitude changes in the helicopter, autogyro, compound helicopter, and gyroplane, by tilting the rotor mast. Embodiments of the present invention provide a means to manipulate a rotor such that the resultant force vector is maintained at or near the aircraft center gravity to prevent excessive moments causing excessive fuselage pitching, especially in slow speed flight and during acceleration and deceleration.

A rotorcraft such as a helicopter, an autogyro, or a gyroplane includes a fuselage, a center of gravity positioned about the fuselage, a rotor assembly, either powered or unpowered, and tail section, with or without a tail rotor, connected to the fuselage, and a propulsion system including an engine mounted to the fuselage and either a turbine or a propeller connected to or driven by the engine. Depending on the configuration, the rotorcraft can also include a wing or wings mounted to the fuselage.

The rotor assembly includes a rotor having either a single or a plurality of rotor blades which can produce a resultant force vector which can pass through or near the center of gravity of the rotorcraft, and a spindle or swashplate to connect the rotor with a flight control assembly. The rotor assembly also includes a titling mast assembly having a tilting mast frame also connected to the spindle or swashplate to support the rotor and to provide some cyclic control. A mast control cylinder provided to tilt the tilting mast assembly. Also included is a drive system having a gearbox and a rotatable driveshaft connected to and driven by the gearbox for driving the rotor.

The flight control assembly has both rotor blade pitch controls for uniformly changing pitch of the rotor blades and cyclic controls connected to the spindle or swashplate for changing the plane of rotation of the rotor both independent of the tilting mast frame and dependent upon the tilt of the tilting mast frame. The pilot can conventionally directly tilt the rotor through direct application of an input to a cyclic stick as with any other rotorcraft, can directly tilt the rotor by tilting the tilting mast frame, and can indirectly tilt the rotor through input applied to the cyclic control linkage resulting from a depending connection of the cyclic control linkage to the tilting mast frame. That is, the cyclic control linkage is pivotally connected to the spindle, the tilting mast frame, and the fuselage, such that the tilting mast frame and cyclic control tilt simultaneously.

In an embodiment of the present invention, a cyclic pivot location and a tilting mast frame pivot location are such that the cyclic control linkage can maintain the rotor resultant force vector through or near the aircraft center of gravity during tilting of the tilting mast. More specifically, in the preferred configuration, the cyclic control linkage is positioned such that the angular movement of the tilting mast frame is slightly less than the angular movement of the spindle during tilting of the tilting mast.

An air cylinder can be used to tilt the tilting mast frame. In the preferred configuration, the air cylinder is of sufficient volume so that a fore/aft spring rate is such that the mast fore/aft natural frequency is less than the minimum operational rotor RPM to avoid a resonance oscillation in the mast.

In an embodiment of the present invention, the tilting of the mast can be accomplished through automated means. In this embodiment, a controller can receive input from an airspeed sensor and an angle of attack sensor to control the mast tilt to keep the fuselage at a desired pitch. This is especially useful in an gyroplane at low speeds in order to keep the wing at an angle of attack for a best lift-to-drag ratio. Additionally, the controller can tilt the tilting mast frame and cyclic control together to a predetermined position. This feature is particularly useful in a gyroplane at high speeds as rotor lift requirements decrease. Additionally, the controller can tilt the tilting mast frame and the cyclic control together during cruise and during landing as necessary to keep the fuselage substantially level, or at some desired pitch. This feature is particularly useful during cruise flight to reduce parasitic drag and during landing to eliminate the need for a large flare. Also, the controller can tilt the tilting mast frame and cyclic control together during flight to accommodate for in flight CG changes.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIGS. 7–14 are a perspective view of a portion of the rotor assembly depicting various flight profiles, according to an embodiment of the present invention.

DETAILED DESCRIPTION

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
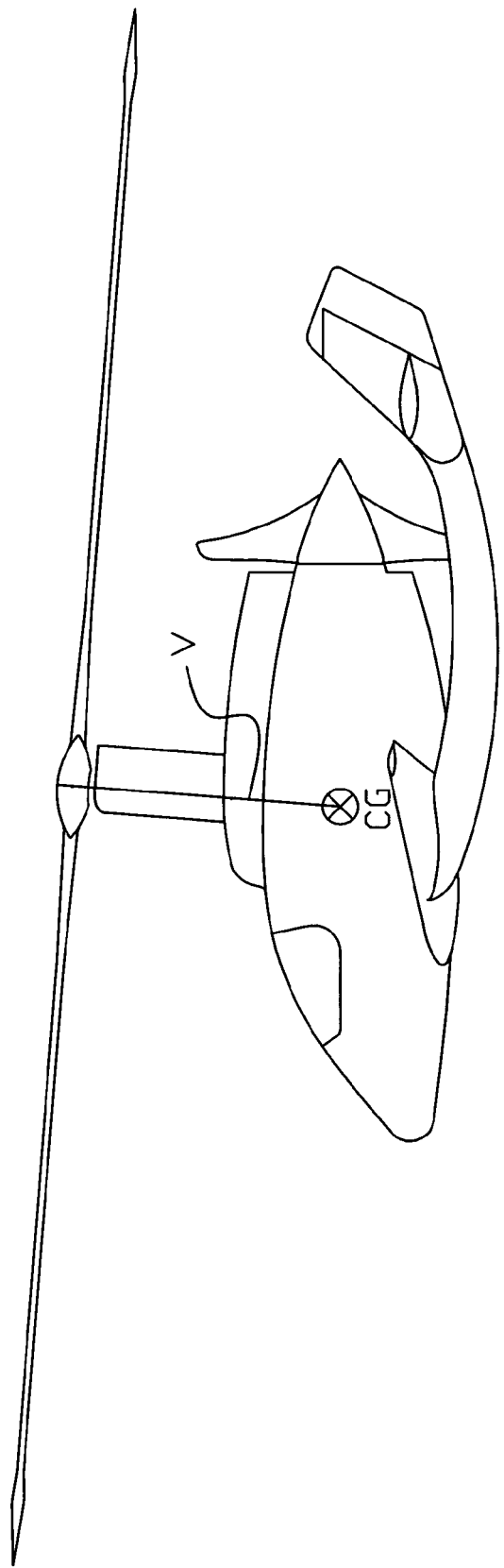
FIG. 1 is a perspective view of a gyroplane according to the prior art.

Referring to FIG. 1, shown is a simplified model of a conventional fixed mast in a rotorcraft having a longitudinal axis passing through or near the design gross weight, and design configuration, aircraft center of gravity CG. The rotorcraft or rotary wing aircraft has blades that rotate to describe or form a plane of rotation ("rotor disc") and which produces a resultant force vector V defined as the vector sum of the rotor's lift and drag forces. Under steady-state conditions, this resultant force vector V passes through or near the aircraft center of gravity CG. In the conventional fixed mast rotorcraft, movement of the rotor disc results in a corresponding movement of the resultant force vector V, with respect to the aircraft center of gravity CG, which further results in the formation of a moment which can cause large and sometimes undesirable fuselage attitude changes to again align the resultant force vector V with the rotorcraft center of gravity CG.

Figure 2:
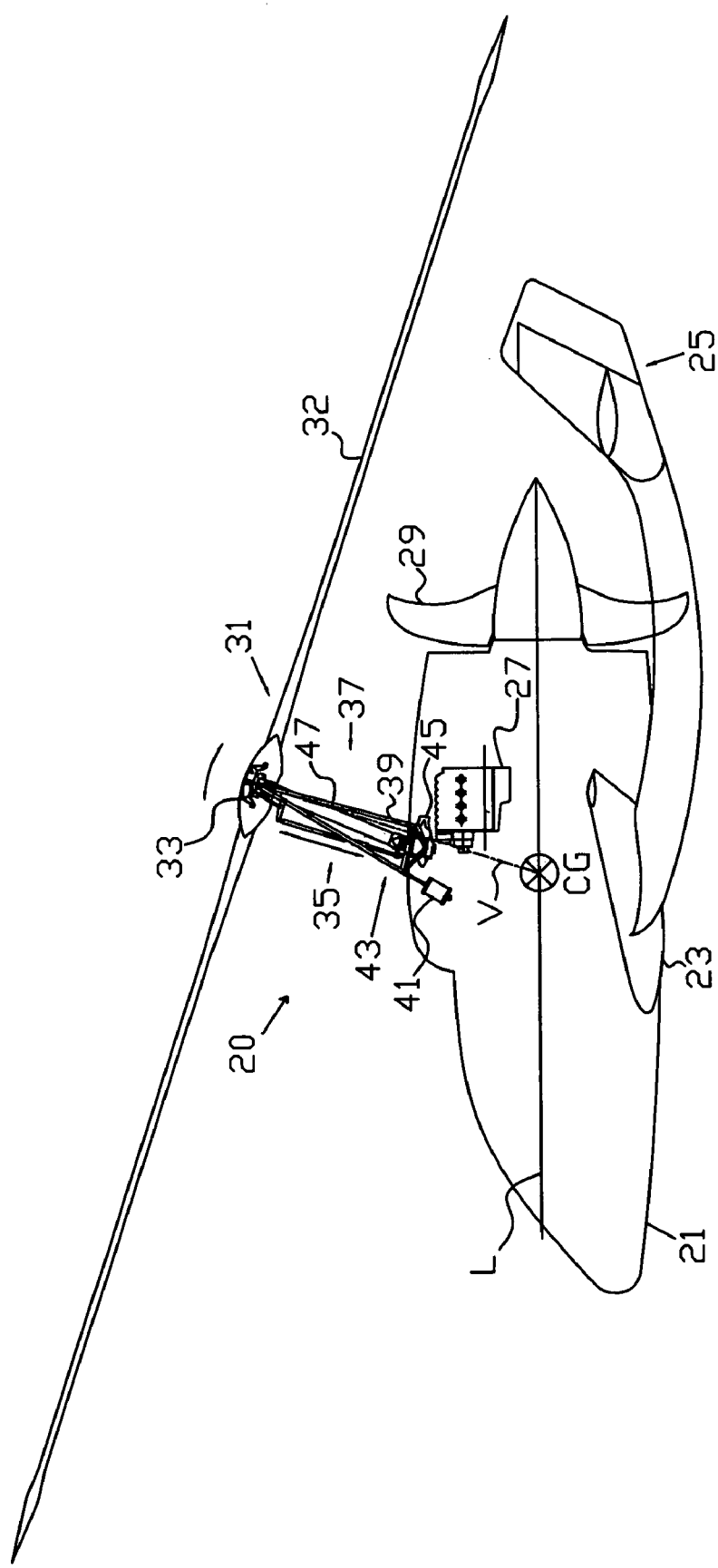
FIG. 2 is a perspective view of a gyroplane having a rotor assembly, according to an embodiment of the present invention.

Referring to FIGS. 2–14, shown is a representative rotorcraft having an aircraft rotor assembly 20 according to an embodiment of the present invention. Referring primarily to FIG. 2, the representative rotorcraft includes a fuselage 21 having a longitudinal axis L, a center of gravity CG positioned within the fuselage 21, a wing or wings 23 mounted to the fuselage 21, a tail section 25 connected to the fuselage 21, and a propulsion system including an engine 27 mounted to the fuselage 21 and either a turbine (not shown) or a propeller 29 connected to or driven by the engine 27. The rotor assembly 20 includes a rotor 31 including either a single or a plurality of rotor blades 32 which can produce a resultant force vector V, and a spindle 33 to connect the rotor 31 with a flight control assembly 35. The rotor assembly 20 also includes a titling mast assembly 37 having a tilting mast frame 39 connected to the spindle 33 to support the rotor 31 and to provide a cyclic input, and a mast control cylinder 41 to provide mast tilt. Also included is a drive system 43 having a gearbox 45 and a rotatable driveshaft 47 connected to and driven by the gearbox 45 for driving the rotor 31. Advantageously, the flight control assembly 35, connected to the spindle 33 has both collective controls 49 (FIG. 5) for uniformly changing pitch of the rotor blades 32 and cyclic controls 51 (FIG. 3) for changing the plane of rotation of the rotor 31.

Figure 3:
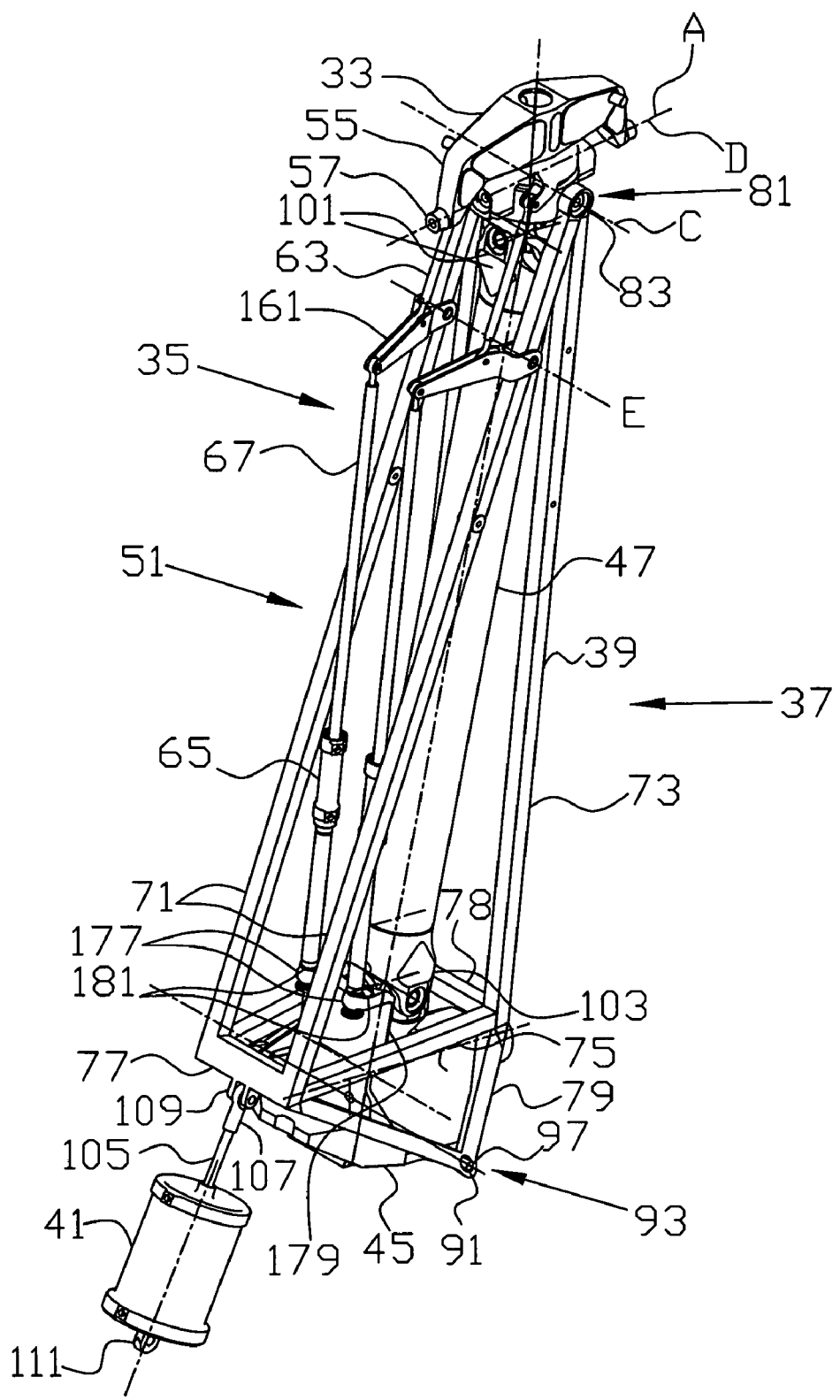
FIG. 3 is a perspective view of a portion of the rotor assembly, according to an embodiment of the present invention.
Figure 4:
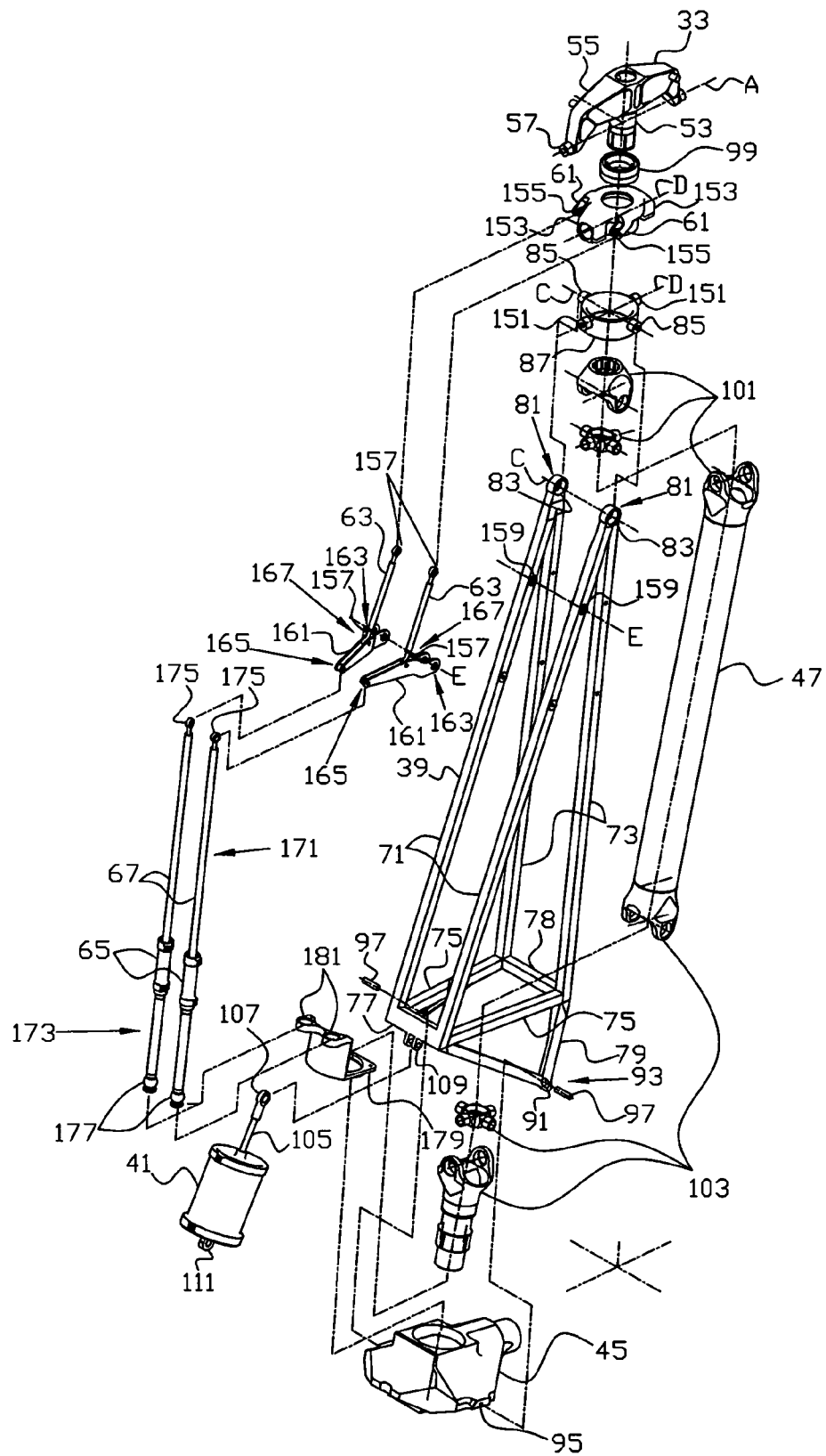
FIG. 4 is an exploded perspective view of the rotor assembly of FIG. 3.

Referring to FIGS. 3–4, more specifically, the spindle 33, shown without its connections to the rotor 31 for clarity, includes a tubular shaft 53 with two opposite projecting arms 55, each arm 55 extending downward and radially outward from the upper end of the tubular shaft 53 and having an outwardly projecting pin 57 located at the end of the arm 55. Each 57 pin is shaped to interface with a hub or other rotor attachment device (not shown) having corresponding pin apertures. The pins 57 serve to rotatably couple the spindle 33 to the rotor blade or blades 32. In the illustrated configuration, an axis passing through the center of the two pins 57 defines a pivot or teetering axis A, which allows for flapping of the rotor blades 32. Spindle 33 also includes a spindle lever 61 (described later) for translating cyclic input to the spindle 33. The spindle tilt is controlled by cyclic pushrods 63 which move in opposite directions for side-to-side rotor tilt, and in the same direction for fore-and-aft rotor tilt, and are controlled by slave cylinders 65 positioned in a medial portion of a pair of cyclic control rods 67 (described later).

The tilting mast assembly 37 includes a triangular shaped tilting mast frame 39. The mast frame 39 is formed of a plurality of forward and aft support legs 71, 73, longitudinal cross supports 75, and forward and aft lateral cross supports 77, 78, and rocker arms 79, with each lateral side of the tilting mast frame 39 preferably a mirror image of the other side of the mast frame 39. Conceptually, the tilting mast frame 39 connects the rotor 31 to the fuselage 21 of the rotorcraft such that forces on the rotor 31 are translated to the fuselage 21 through the tilting mast assembly 37. More specifically, each side of the tilting mast assembly 37 includes the forward support leg 71 and an aft support leg 73 which are connected at their uppermost ends at an apex 81. The apex 81 includes an aperture 83 which receives lateral pins 85 from a spindle yoke 87. Bearings (not shown), preferably needle bearings, or others known and understood by those skilled in the art, are positioned within the apertures 83, to facilitate rotation. The forward lateral cross support 77 is connected adjacent the lower end of each of the forward support legs 71 by a means known to those skilled in the art. The forward lateral cross support 77 provides spacing between the pair of forward support legs 71 and overall added structural support to the tilting mast frame 39. The forward lateral cross support 77 also provides a rotatable connection point for the tilting mast frame 39 to the mast control cylinder 41 (described later).

A pair of preferably "V" shaped rocker arms 79 are positioned on either lateral side of the tilting mast assembly 39 to provide a lower tilting mast pivot location. Each rocker arm 79 has a pair of upper ends which connect adjacent to the lower ends of the forward and aft support legs 71, 73, respectively, by means known to those skilled in the art. Each rocker arm 79 also includes a rocker arm aperture 91 positioned at its respective lower apex 93. The lower apex 93 is connected to a gearbox mount 95, to form a mast pivot point. The gearbox 45 is connected to the fuselage 21, thus translating the rotor load to the fuselage 21. The gearbox mount 95 receives a pair of rocker arm shafts 97 received by rocker arm aperture 91. Each rocker arm aperture 91 also includes a bearing or bearing assembly, such as, for example, a pair of elastomeric bearings (not shown), which are received by the rocker arm apertures 91. Alternatively, the rocker arm shaft 97 can be connected either directly to the fuselage 21 or indirectly to the gearbox 45 using a mounting assembly (not shown).

The longitudinal cross support 75 connects between either the forward and aft support legs 71, 73, or adjacent the upper ends of the rocker arms 79 in order to add structural stability to the tilting mast frame 39. The longitudinal cross supports 75, as with other portions of the tilting mast frame 39, are also connected by a method known to those skilled in the art including welding, unibody construction, or through use of fasteners (not shown). The aft lateral cross support 78 positioned between the pair of aft support legs 73, is also connected by a method known to those skilled in the art. The aft lateral cross support 78, like the forward lateral cross support 77 and the spindle yoke 87, provides spacing between the pair of aft support legs 73 and provides added structural support to the tilting mast frame 39.

A shaft 53 of spindle 33 turns on a double row ball bearing 99 inside spindle lever 61. Spindle 33 is coupled through an upper universal joint 101 to driveshaft 47, to lower universal joint 103, and finally to the gearbox 45 connected to or including a drive unit (not shown) such as, for example, a drive pulley or planetary gear arrangement. A power takeoff means such as an input drive shaft or a drive belt (not shown) can be connected to the power plant or engine 27 (FIG. 2) which turns the drive unit. In this embodiment, universal joint 101 is necessary because driveshaft 47 is not aligned with spindle 33 when spindle 33 is tilted. Also, in the preferred configuration, driveshaft 47 is not aligned with the gearbox 45 when the tilting mast frame 39 is tilted. Spindle 33, universal joints 101, 103, driveshaft 47, and drive unit (not shown) rotate with the rotor 31. Universal joints 101, 103, can be plain or constant velocity universal joints. If they are plain universal joints, the rotor 31 should be positioned approximately normal to the longitudinal axis of the driveshaft 47, such that the angle between its rotational axis and the longitudinal axis of the driveshaft 47 is substantially equal to the angle between the longitudinal axis of the drive shaft 47 and the gearbox 45, until the power takeoff means (not shown), such as, for example, a prerotator, is disconnected from driving the driveshaft 47 to prevent damage to the universal joints 101, 103. Where the universal joints 101, 103, are of a constant velocity type, no such requirement exists and the rotor 31 may be pre-rotated or driven at any angle within the tilting ranges of the tilting mast assembly 37 and spindle 33.

The mast control cylinder 41 provides the actual mechanism for controlling mast tilt. The mast control cylinder 41 is preferably in the form of a pneumatic cylinder of sufficient volume so that a fore/aft spring rate of the cylinder 41 is such that a mast fore/aft natural frequency is less than a minimum operation rotor rpm to avoid a resonance oscillation of the tilting mast assembly 37. Though a pneumatic cylinder is preferred due to the achievement of specific benefits such as dampening, a hydraulic cylinder or even an electric actuator is within the scope of the present invention. The mast control cylinder 41 includes a cylinder rod 105 having an attachment such as a rod end bearing 107 connected to an attachment such as a clevis 109 in a medial portion of the forward lateral cross support 77. The mast control cylinder 41 is further rotatably connected to the aircraft fuselage 21 by means known to those skilled in the art. As shown in FIGS. 8–10, extension and retraction of the cylinder rod 105 results in a rotational movement of the tilting mast assembly 37 about the mast pivot point (apex 93), which tilts the tilting mast frame 39, and correspondingly, the spindle 33, rotor 31, and rotatable driveshaft 47. The mast control cylinder 41 can rotate about connection 111 because the cylinder rod 105 does not remain in the same plane due to the rotational movement of the forward lateral cross support 77 during tilting of the tilting mast frame 39.

Figure 6:
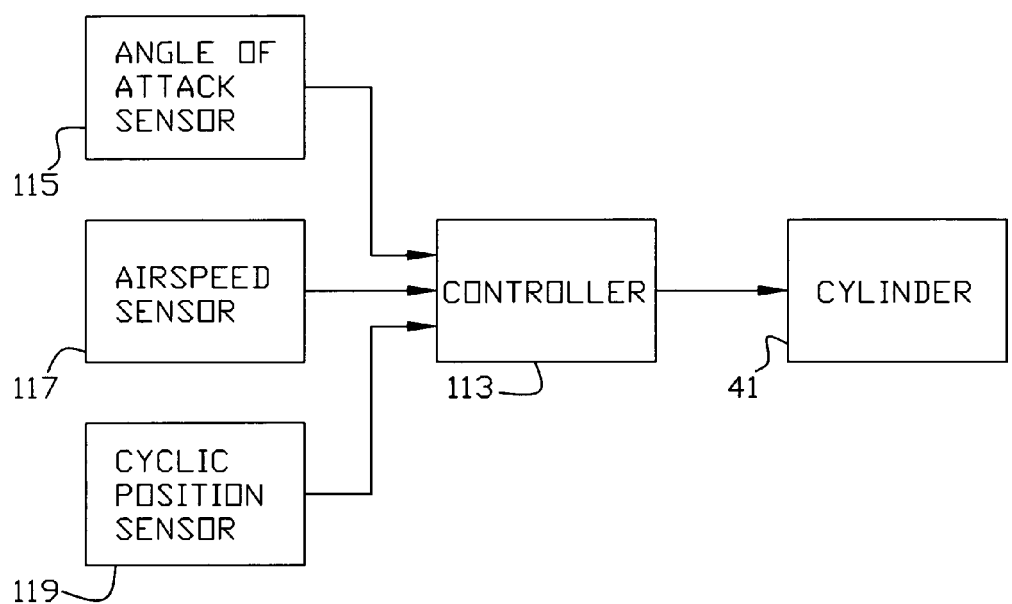
FIG. 6 is a schematic diagram of an automated control for the rotor assembly, according to an embodiment of the present invention.

Referring to FIG. 6, in an embodiment of the present invention with respect to the illustrated rotorcraft, the mast tilt will be controlled automatically by a controller 113. The controller 113 can receive input from the various aircraft sensory components such as, for example, an angle of attack sensor 115, airspeed sensor 117, and cyclic position sensor 119, just to name a few. In the preferred configuration, the mast tilt will be controlled automatically, responsive to the angle of attack indicator 115 at low speeds to keep the rotorcraft wing or wings 23 at an angle of attack for best lift-to-drag (L/D), and then set to a predetermined angular rotational position at high speeds as rotor lift requirements decrease and therefore have little influence on aircraft pitch. Though mast tilt could be controlled by speed, cyclic stick position, or some other means, using an angle of attack sensor 115 is preferred because it provides a direct measure of the angle of attack on the wing 23, and thus fuselage attitude, independent of aircraft weight, speed, or air density.

Figure 5:
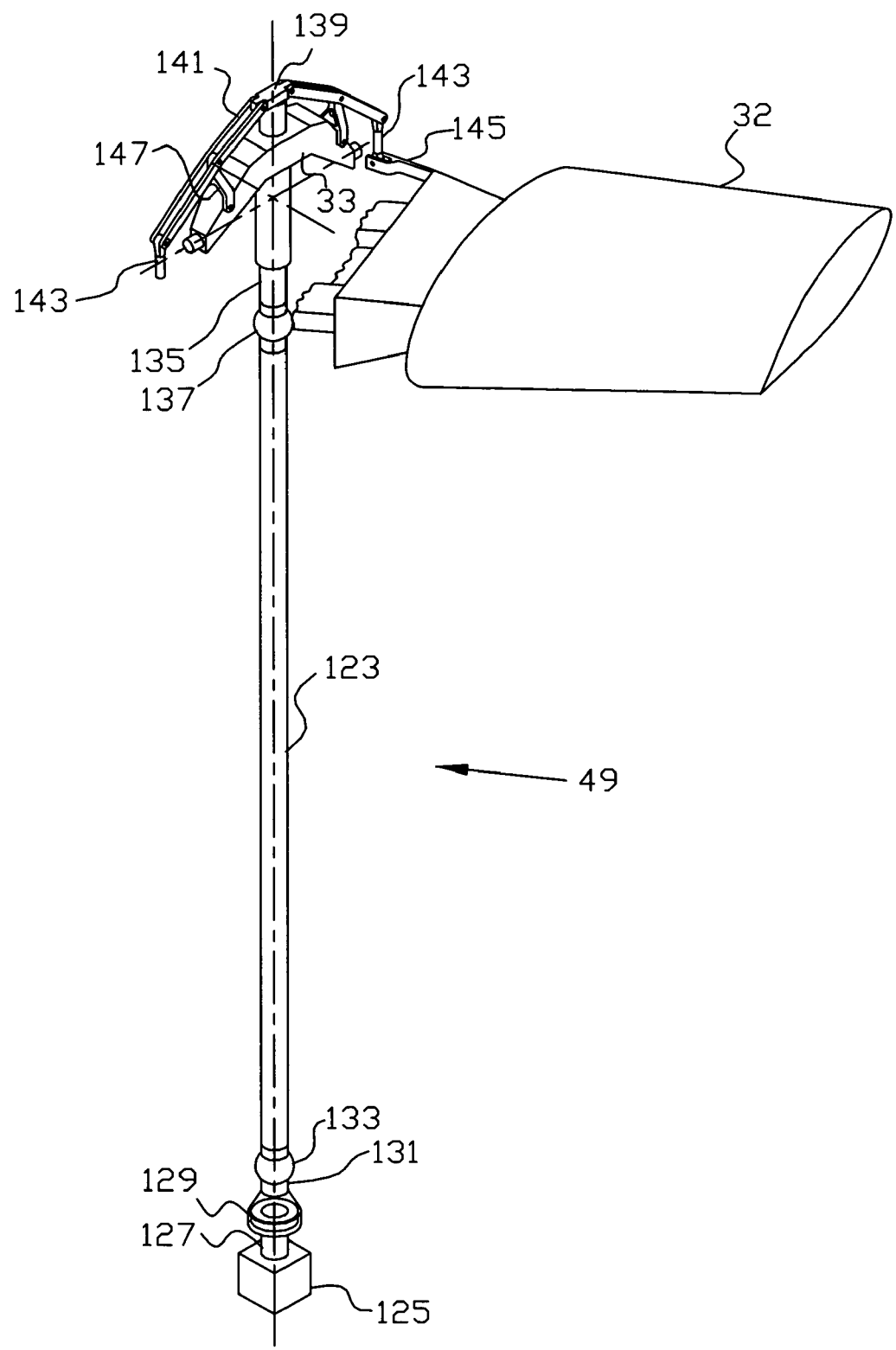
FIG. 5 is an exploded perspective view of a pitch control mechanism for the rotor assembly of FIG. 3.

Referring to FIG. 2, the illustrated embodiment depicts the teetering hinge arrangement for connecting the rotor blades 32 to the rotorcraft. Thus, the detailed description that follows is merely for illustrative purposes and with respect to one type of pitch control utilized with a teetering hinge-type arrangement. Other types of arrangements such as, for example, that used with respect to a conventional swashplate are, of course, within the scope of the present invention. As shown in FIG. 5, in the illustrated embodiment, in addition to the above described cyclic controls 51, the rotorcraft includes blade pitch (collective) controls 49 including a collective shaft 123 which passes approximately through the center of the rotatable drive shaft 47 and tilting mast assembly 37 (FIG. 3-4). In the preferred configuration, the rotatable driveshaft 47 has a conduit (not shown) which allows passage of a lower collective shaft 123 which provide for uniformly changing pitch of the rotor blades 32. Pitch control is initiated by a hydraulic cylinder assembly 125 which extends and retracts rod 127. Rod 127 pushes on the inner race of bearing 129. The outer race of bearing 129 is connected to rod 131, which is connected to lower collective shaft 123 by a universal joint 133. Lower collective shaft 123 is connected to upper collective shaft 135 by universal joint 137. Upper collective shaft 135 extends through the axis of rotation of spindle 33 to collective tee 139. A collective arm 141 extends radially outward in each direction from collective tee 139. The inner end of each collective arm 141 is pivotably attached to the collective tee 139, and the outer end is connected by a pushrod 143 to a rotor blade 32 via a connector such as, for example, a pitch horn 145. A collective brace 147 is pivotably mounted at its upper end to a medial point of each collective arm 141 and is pivotably mounted at its lower end to each arm 55 (FIG. 4) of spindle 33, fixing the center of collective arm 141 in relation to the arms 55 of the spindle 33.

When the pilot moves the collective control (not shown) to increase rotor blade pitch, the lower collective shaft 123 moves downward, which moves the upper collective shaft 135 downward, which moves collective tee 139 downward, which moves the inner end of collective arm 141 downward. Since collective brace 147 fixes the medial portion of the collective arm 141, the outer end of collective arm 141 moves upward, pivoting about the upper end of collective brace 147, and moving the pitch horn pushrods 143 upward, increasing the pitch of the rotor 32. Correspondingly, to decrease the pitch of the rotor blade 32, the above action is reversed. The lower collective shaft 123 and upper collective shaft 135 are moved upward so that the outer ends of collective arms 141 are pivoted downward. The pitch horn pushrod 143 connected to the pitch horn 145 of the rotor blade 32 is thereby moved downward, thus decreasing the pitch of the rotor blade 32.

Referring again to FIGS. 3–4, as stated previously, the cyclic controls (linkage) 51 shown use a tilting spindle 33 to control the plane of rotation of the rotor 32. In addition to the pair of lateral outwardly extending pins 85 received by apertures 83 adjacent the apex 81 of the tilting mast frame 39, the spindle yoke 87 includes a pair of lateral outwardly extending pins 151. Correspondingly, the spindle lever 61 has a pair of fore and aft apertures 153 preferably containing bearings, such as, for example, needle bearings, which receive the outwardly extending pins 151. Where spindle lever 61 pivots fore and aft on axis C around pins 85, the outwardly extending pins 151, received by the fore and aft apertures 153, allow spindle yoke 87 to pivot side to side on axis D. Axis C and axis D of spindle yoke 87 intersect perpendicular to each other and are known as the spindle pivot axes. The spindle tilt control is applied through the pair of pushrods 63 connected to spindle lever 61, as will be described below. The spindle lever 61 has a pair of spaced apart devises 155 for attachment of cyclic pushrods 63 through bearing rod ends 157. Alternatively, spindle lever 61 can instead include a mount (not shown) such as a pair of spaced apart apertures to provide a pin or other connection of the cyclic pushrods 63 according to a method known to and understood by those skilled in the art.

Each forward support leg 71 of the tilting mast frame 39 can include at least one idler arm attachment 159 positioned at a medial point along each of the forward legs 71. The attachment 159 is preferably in the form of an aperture-rotatable pin and bearing arrangement, as illustrated, but can be in the form of a clevis to mate with rod end, or other hinge means known to those skilled in the art. An idler arm 161 having first and second ends 163, 165, is hinged freely by the first end by the idler arm attachment 159 to the medial portion of each of the forward legs 71. Both idler arms 161 are preferably freely hinged about an axis E but can be alternatively hinged along separate axes. Each idler arm 161 includes a cyclic pushrod attachment 167 positioned at a medial point along the idler arm 161. The cyclic pushrod attachment 167 can be in the form of a clevis to receive the lower rod ends 157 of the cyclic pushrods 63 or aperture through the body of each idler arm 161 positioned in the medial portion of the each of idler arm 161 (as illustrated). Alternatively, the cyclic pushrod-idler arm connection can be in the form of an aperture with a pin or pin bearing connections, or other hinge means known to those skilled in the art. The second end 165 of each of the idler arms 161 is connected to a respective cyclic control rod 67 via an attachment such as a clevis or alternative arrangement, as described above, associated with the second end 165 of idler arm 161.

Referring primarily to FIG. 4, each cyclic control rod 67 connects to the idler arms 161 and includes an upper section 171, a lower section 173, with the slave cylinder 65 connected, therebetween. More specifically, each upper section 171 of the cyclic control rod 67 has an upper rod end 175 that connects to one of the idler arms 161 preferably via a rod end bearing-clevis arrangement, as described above. The lower end of the upper cyclic control rod section 171 further connects to the upper end of the slave cylinder 65. The upper end of the lower section 173 connects to the lower end of the slave cylinder 65. In the preferred configuration, the lower end of the lower section 173 includes a spherical bearing 177. The spherical bearings are further housed in a mounting bracket 179 fixedly connected directly to the fuselage 21 (FIG. 2) or connected to the gearbox 45. The mounting bracket 179 can include a pair of apertures 181 for holding the spherical bearing 177 which receive or connect to the lower end of the lower section 173 of the cyclic control rod 67. In this configuration, the lower section 173 can include threading to mate with the spherical bearing 177 or can be connected using a fastener or other means known to those skilled in the art. Alternatively, the connection can also be via a combination clevis-rod end bearing arrangement (not shown), similar to those described above. The lower section 173 of the cyclic control rod 67 is preferably in the form of a hollow tube that provides a conduit (not shown) for an actuator (not shown) positioned to actuate the slave cylinder 65. Though not illustrated, one such type of actuator can include a push-pull rod which connects a push-pull cable to a piston (not shown) within the slave cylinder 65. The slave cylinder 65 can receive such input from the push-pull cable through the push-pull rod to provide an either hydraulic or pneumatic boost to the cyclic controls 67 in order to lessen the force required by a pilot to move such controls.

Spindle tilt is provided through the combination of the cyclic control rods 67 having slave cylinder 65, the idler arms 161, and the cyclic pushrods 63. The cyclic control rods 67 are connected to the second end 165 of the idler arms 161 with rod ends 175. The slave cylinders 65 provide upward and downward input to the idler arms 161. Correspondingly, a medial portion of each idler arm 161 is connected with the cyclic pushrods 63 at the lower rod ends 157 of cyclic pushrods 63. The idler arms 161 allow an upward and downward rotational movement about axis E, preferably parallel to and spaced apart from axis C. The idler arms 161 act as a lever arm which provides a mechanical advantage to further reduce the input required by the pilot to move the cyclic controls 67. The idler arms 161 translate the input from the cyclic control rods 67 to the cyclic pushrods 63, which individually further apply input to the spindle lever 61. Asymmetric input by the slave cylinders 65 provide the ability for the spindle lever 61 to pivot on pins 85, 151, along axis C, D, simultaneously. Pivoting along axis C and D provides the ability to change the plane of rotation of the rotor 31 and thus the direction of the resultant force vector V (FIG. 2).

Referring also to FIGS. 7–14, by adjusting the mast tilt and the cyclic control together, the rotor 31 can be at any angle relative to the aircraft, within the range of mast tilt, with the rotor resultant force vector V still passing through or near the aircraft center of gravity CG. This allows the aircraft pitch attitude to be independent of the rotor angle of attack. Also, by pivoting one end of the cyclic control rods 67 from a fixed location on the airframe, the coupling between the rotor tilt and mast tilt can be controlled by the distance selected between the pivot location of the cyclic control rod 67 (aperture 181) and the pivot location of the tilting mast frame 39 (apex 93). Thus, depending upon the spacing between the pivot location of the cyclic control rod 67 and the pivot location of the tilting mast frame 39, this coupling can vary from one having the rotor angle being independent of mast angle, to one having the rotor resultant force vector V passing through or near the aircraft CG regardless of mast tilt.

In the preferred configuration, this distance is selected such that the angular tilt of the rotor 31 through spindle 33 lags behind or is slightly less than tilt of the tilting mast frame 39, resulting in a shift of the resultant force vector V slightly away from the reference positioned at or near the aircraft center of gravity CG. This offset requires the pilot to make some manual correction to again position the resultant force vector V to pass through the desired position at or near the aircraft center of gravity CG. This provides the pilot a "feel" that would not otherwise be provided if the resultant force vector V was perfectly maintained through the center of gravity CG. Operational implementation of the preferred configuration is described below.

Referring to FIG. 7, for a jump takeoff, the titling mast assembly 37, via the tilting mast frame 39, is generally positioned adjacent its forward-most setting. Additionally, the rotor 31, via the spindle 33, is generally positioned near its center setting or even slightly forward of center. The positions of the tilting mast frame 39 and the rotor 31 combine to provide a forward thrust vector. The positioning of rotor 31 increases the forward thrust component or decreases the aft thrust component of the rotor resultant force vector V in order to provide forward thrust to the rotorcraft, or at least decrease the drag from the rotor 31. This is accomplished by tilting the resultant force vector V forward while minimizing the need to tilt the fuselage 21 forward, which would result in an unnecessary increase in parasitic drag or an undesirable fuselage attitude. Note, prior to takeoff, there is minimal fore and aft cyclic loading occurring as would exist during acceleration, cruise, or deceleration conditions as the takeoff is generally vertical. During a rolling takeoff, the titling mast assembly 37 can be initially configured in an aft setting similar to that illustrated for climb out (FIG. 8) in order to provide additional takeoff lift followed by a more forwardly tilted configuration.

Referring to FIGS. 8–10 during takeoff, if the titling mast assembly 37 is not already in a forward position, as the aircraft begins to accelerate, the controller 113 (FIG. 6) can automatically or the pilot can manually tilt the titling mast assembly 37 toward its forward tilted setting. More specifically, once the aircraft is in the air, responsive to a detection of a low airspeed sufficient for climb out, and responsive to the angle of attack obtained from the angle of attack sensor 115, the controller 113 automatically or the pilot manually can adjust the mast tilt to attain and maintain an optimum angle of attack on the wings 23. For illustrative purposes, beginning from an aft tilted position (FIG. 8), the controller (FIG. 6) tilts the tilting mast frame 39 by causing the mast control cylinder 41 to retract the cylinder rod 105, applying force to the forward lateral cross support 77. This pulling force results in a rotational movement of the tilting mast assembly 37 about the mast pivot point (apex 93) which tilts the tilting mast frame 39, and correspondingly the spindle 33, rotor 31, and rotatable driveshaft 47.

In the preferred embodiment of the present mention, due to the spatial relationship of the pivot location of the cyclic control rods 67 (apertures 181) and the pivot location (apex 93) tilting mast frame 39, as the tilting mast frame 39 tilts forward, the rotor 31 via the spindle lever 87 will correspondingly tilt forward slightly. After movement of the tilting mast frame 39 by the controller 113, the resultant force vector V will, however, generally be positioned slightly forward of the CG (FIG. 9) if the pilot does not move the cyclic control stick (not shown). This will require the pilot to manually move the cyclic control stick forward to maintain the resultant force vector V passing through the desired location at or near the aircraft CG as airspeed increases (FIG. 10). If the pilot does not move the cyclic control stick forward, in the illustrated configuration, the aircraft will tend to pitch up as a result of the rotor force vector V passing in front of the aircraft CG. This pitching movement of the aircraft will cause the aircraft to tend to slow back down, providing inherent speed stability (dynamic stability).

Referring to FIGS. 6 and 8–10, as the aircraft accelerates and climbs, responsive to a detection of the airspeed obtained from the airspeed sensor 115, and responsive to the angle of attack obtained from the angle of attack sensor 115, the controller 113 automatically, or the pilot manually, adjusts the tilting mast assembly 37 to compensate for in-flight CG changes, or to maintain a desired fuselage attitude (such as to aim weapons/sensors). In normal operation, the controller will preferentially maintain a fuselage attitude that results in an optimum angle of attack on the wings 23 (FIG. 2). In most flight profiles, this input either from the controller 113 or the pilot results in a tilting forward of the tilting mast assembly 37, and thus the rotor 31, as the aircraft accelerates in order to provide sufficient lift for the climb-out while maintaining the fuselage 21 in an attitude preferably providing the wing(s) 23 their best lift/drag ratio. For a jump takeoff, during climb-out, the tilting mast assembly 37 will initially tilt aft (FIGS. 11–13) to provide sufficient lift for the climb-out when the rotor 31 is producing most of the lift. If the rotorcraft was instead configured, such as that shown in prior art FIG. 1, with a fixed mast and the wing incidence angle set for high speed cruise, the wing 23 would be in a stall at the high angle of attack needed by the rotor 31 when rotor 31 is producing most of the lift, as is the profile during the climb-out.

Referring to again FIGS. 8–10, for illustrative purposes only, the above described aft tilting of the mast is then typically later followed by a forward tilting of the tilting mast assembly 37 and rotor 31, similar to that described above regarding takeoff, combined with a reduction in collective pitch. This is accomplished in order to reduce lift provided by rotor 31 as the wings 23 takeover providing lift to the rotorcraft and as the rotorcraft gravitates toward a cruise profile (FIG. 14). For cruise, due to the high speeds and minimal requirement for the rotor 31 to produce lift, in the preferred configuration, the controller 113 (FIG. 6) or pilot preferably positions the tilting mast assembly 37 in a predetermined position based on the aircraft type and cruise profile. The forward positioning of the tilting mast assembly 37 and rotor 31 allows the aircraft fuselage 21 and the rotor 31 to be substantially level (horizontal) to reduce parasitic and induced drag to thereby improve overall rotorcraft performance. Note, in the illustrated embodiment, the rotor resultant force vector V does not necessarily have to go through the center of gravity CG during high speed cruise, since the rotor 31 will be substantially unloaded and any moment caused by its force being off of the CG can be compensated for by a horizontal stabilizer associated with tail section 25. For a more conventional gyro or helicopter, the rotor resultant force vector V will generally need to pass through the center of gravity CG unless otherwise compensated for.

Referring to FIGS. 11–13, for illustrative purposes only, in a decelerative profile such as that required for landing, the rotor 31 may again need to produce most of the lift. Unlike the situation with a conventional fixed mast, the tilting mast frame 39 allows the tilting mast assembly 37 and rotor 31 to be tilted aft to increase the angle of attack on the rotor 31 and thus increase lift and to provide for deceleration. Advantageously, this is accomplished without causing excessive pitching of the fuselage 21. More specifically, responsive to a low airspeed and responsive to the angle of attack indications obtained from the angle of attack sensor 115, the controller 113 (FIG. 6) automatically or the pilot manually can adjust the tilt of the tilting mast assembly 37 toward an aft most position to either maintain an optimum angle of attack on the wings 23 or a level profile of the fuselage 21, depending upon the airspeed. The controller 113 or pilot tilts the tilting mast frame 39 by causing the mast control cylinder 41 to again extend the cylinder rod 105.

During landing, especially during an autorotative landing, once the airspeed drops below a minimum speed, such as, for example, 30 knots, the controller 113 can position the tilting mast assembly 37 in its aft-most tilted setting to minimize any pitch-up requirement needed for landing. Specifically, the tilting mast assembly 37 is titled back so that the rotor 31 will be tilted back. The spatial relationship of the pivot location of the cyclic control rods 67 (apertures 181) and the pivot location tilting mast frame 39 (apex 93), is such that the rotor resultant force vector V preferably still passes through or near the center of gravity CG, while at the same time, maintaining the fuselage relatively level. This helps eliminate the need for a large flare in the final stage of the landing, since the rotor 31 is already in a position to slow the rotorcraft. This greatly reduces the risk of the tail 25 (FIG. 2) of the rotorcraft striking the landing surface.

The invention has several advantages. The aircraft rotor assembly includes a mast that rotates or tilts such that the rotor resultant force vector remains generally through or near the aircraft center of gravity. The aircraft rotor assembly also includes a tilting spindle to provide for cyclic adjustment of the rotor disc. This helps eliminate the design and flying problems and concerns caused by fuselage attitude changes in the helicopter, autogyro, compound helicopter, and gyroplane, caused by tilting the rotor mast.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the illustrated embodiment depict nonrotating cyclic linkage interfaced with a tilting spindle to control the rotor cyclic. Also illustrated was a tiltable mast including a driveshaft for driving the rotor having pitch controls positioned therethrough. A similar mechanism, however, could also be used on a more conventional swashplate control having either rotating or nonrotating components providing cyclic and/or collective inputs to the rotor disc. Also for example, the rotor head was illustrated of a type using a teetering hinge. Other rotorhead types such as a fully articulated system are also within the scope of the present invention.

The invention claimed is:

1. A rotorcraft comprising:
   a fuselage having a wing for providing lift during forward flight;
   a propulsion source for propelling the aircraft forward during forward flight;
   a rotor for providing lift during take-off and landings and for auto-rotating in a substantially unloaded condition during forward flight;
   a tilting mast including a driveshaft extending upward from the fuselage and a tilting mast frame to tilt the tilting mast relative to the fuselage, the rotor being carried by the tilting mast; and
   a cylic control assembly that selectively tilts the rotor relative to the tilting mast, the cyclic control assembly being selectively controllable so that a rotor force vector can pass through a center of gravity of the rotorcraft at all angles of tilt of the tilting mast.

2. The rotorcraft defined in claim 1, wherein the cylic control assembly comprises:
   a cyclic control; and
   a spindle mounted to the tilting mast frame for supporting the rotor and to connect the rotor to the cyclic control, the cyclic control, spindle and rotor being carried by the tilting mast.

3. The rotorcraft defined in claim 2, wherein the tilting mast frame is pivotally connected to the spindle and a first fixed location on the fuselage and the cyclic control is pivotally connected to the spindle and a second fixed location on the fuselage, separate and spaced apart from the first fixed location on the fuselage, and wherein the tilting mast frame and cyclic control tilt simultaneously.

4. The rotorcraft defined in claim 2, wherein the cyclic control includes a pair of cyclic control rods, each cyclic control rod having one end pivotally connected to a fixed location on the fuselage, the opposite end pivotally connected to a tilting component of the tilting mast frame.

5. The rotorcraft defined in claim 2, further comprising a power cylinder connected between the tilting mast frame and the fuselage to tilt the tilting mast frame along a longitudinal axis of the fuselage.

6. The rotorcraft defined in claim 5, wherein the cylinder for tilting the tilting mast frame comprises a pneumatic cylinder of sufficient volume so that a fore/aft spring rate is such that the mast fore/aft natural frequency is less than a minimum operation rotor RPM to avoid a resonance oscillation in the mast.

7. The rotorcraft defined in claim 2, wherein the cyclic control includes linkages connected to the tilting mast frame for maintaining a rotor resultant force vector through or near the aircraft center of gravity during tilting of the tilting mast.

8. The rotorcraft defined in claim 2, wherein the cyclic control includes linkages connected to the tilting mast frame and a fixed position on the fuselage such that the angular movement of the spindle is slightly less than the angular movement of the tilting mast frame.

9. The rotorcraft defined in claim 1, further comprising:
   at least one wing;
   an angle of attack sensor; and
   a controller, responsive to the angle of attack sensor, for controlling the mast tilt at selected speeds to keep the fuselage at a desired attitude, such as that required for the wing to be at an angle of attack for a desired lift-to-drag ratio.

10. The rotorcraft defined in claim 2, further comprising:
    an airspeed sensor; and
    a controller, responsive to the airspeed sensor, for tilting the tilting mast frame to a predetermined position at selected speeds as rotor lift requirements decrease.

11. The rotorcraft defined in claim 2, further comprising:
    a controller positioned to tilt the tilting mast frame during horizontal flight as necessary to keep the fuselage substantially level and to tilt the tilting mast frame during a final stage of landing in an aft angular position to keep the fuselage substantially level.

12. A rotorcraft including:
    a fuselage;
    a rotor;
    a cyclic control for controlling rotor cyclic position including a pair of cyclic control rods, each cyclic control rod having a first end and a second end, the first end pivotally connected to a fixed location on the fuselage; and
    a tilting mast including a driveshaft extending upward from the fuselage and a tilting mast frame to tilt the tilting mast and to provide input to the cyclic control, a second end of the cyclic control pivotally connected to a tilting component of the tilting mast frame, both the tilting mast frame and cyclic control positioned to tilt simultaneously relative to the fuselage.

13. The rotorcraft defined in claim 12, further comprising a power cylinder connected between the tilting mast frame and the fuselage to tilt the tilting mast frame along a longitudinal axis of the fuselage.

14. The rotorcraft defined in claim 13, wherein the cylinder for tilting the tilting mast frame comprises a pneumatic cylinder of sufficient volume so that a fore/aft spring rate is such that the mast fore/aft natural frequency is less than a minimum operation rotor RPM to avoid a resonance oscillation in the tilting mast.

15. The rotorcraft defined in claim 12, wherein the cyclic control includes linkage connected to the tilting mast frame and a fixed position on the fuselage for maintaining the rotor resultant force vector through or near an aircraft center of gravity during tilting of the mast, and wherein the angular movement of the spindle is slightly less than the angular movement of the tilting mast frame.

16. The rotorcraft defined in claim 12, further comprising:
    at least one wing;
    an angle of attack sensor for sensing the angle of attack of the wing;
    an airspeed sensor for sensing the airspeed of the rotorcraft; and
    a controller, responsive to the angle of attack sensor and airspeed sensor, for controlling the mast tilt at selected speeds to keep the fuselage at a desired attitude, such as that required for the wing to be at an angle of attack for a best lift-to-drag ratio, for tilting the tilting mast frame to a predetermined position at selected high speeds as rotor lift requirements decrease to maintain the fuselage substantially level, and to tilt the tilting mast frame during a final stage of landing in an aft angular position to maintain the fuselage substantially level.

* * * * *